United States Patent [19]

Takagi et al.

[11] Patent Number: 5,424,797
[45] Date of Patent: Jun. 13, 1995

[54] FLASH LIGHTING APPARATUS

[75] Inventors: Tadao Takagi, Yokohama; Takatoshi Ashizawa, Kawasaki, both of Japan

[73] Assignee: Nikon Corporation, Tokyo, Japan

[21] Appl. No.: 115,650

[22] Filed: Sep. 3, 1993

Related U.S. Application Data

[63] Continuation-in-part of Ser. No. 891,158, May 29, 1992, abandoned.

[30] Foreign Application Priority Data

| Jun. 3, 1991 | [JP] | Japan | 3-160141 |
| Oct. 9, 1991 | [JP] | Japan | 3-290767 |
| Dec. 19, 1991 | [JP] | Japan | 3-336960 |
| Sep. 9, 1992 | [JP] | Japan | 4-240467 |

[51] Int. Cl.⁶ ............................................. G03B 15/05
[52] U.S. Cl. ........................... 354/413; 354/227.1; 354/149.1; 354/126; 362/18
[58] Field of Search ............ 354/418, 432, 413, 414, 354/415, 227.1, 149.1, 126; 362/16, 17, 18

[56] References Cited

U.S. PATENT DOCUMENTS

| 4,085,316 | 4/1978 | Quinn | 362/16 |
| 4,501,481 | 2/1985 | Kataoka et al. | 354/413 |
| 4,816,854 | 3/1989 | Tsuji et al. | 354/413 |
| 4,847,680 | 7/1989 | Okino | 354/430 X |
| 4,941,009 | 7/1990 | Yoshida | 354/414 |
| 5,164,759 | 11/1992 | Yasukawa | 354/432 X |

FOREIGN PATENT DOCUMENTS 1-108538 4/1989 Japan.
2-138719 11/1990 Japan.

Primary Examiner—Russell E. Adams
Attorney, Agent, or Firm—Shapiro and Shapiro

[57] ABSTRACT

A flash lighting apparatus effects proper lighting for different portions of an object field by the use of a light control device disposed on an optical path between a flash light emitter and the object field. In one embodiment, the flash light control device has a plurality of main control portions and at least one sub-control portion adjacent to main control portions. An adjusting circuit adjusts the quantity of light projected by the control portions so that the quantity of light projected by a sub-control portion may be between the quantities of light projected by the adjacent main control portions. In one embodiment, a single booster circuit provides boosted voltage for use in a light emission control circuit that causes flash light emission and also for use in a control circuit for a light control device. In one embodiment, a photometering circuit photometers areas of an object field, and the number of light control portions is greater than the number of photometered areas.

8 Claims, 14 Drawing Sheets

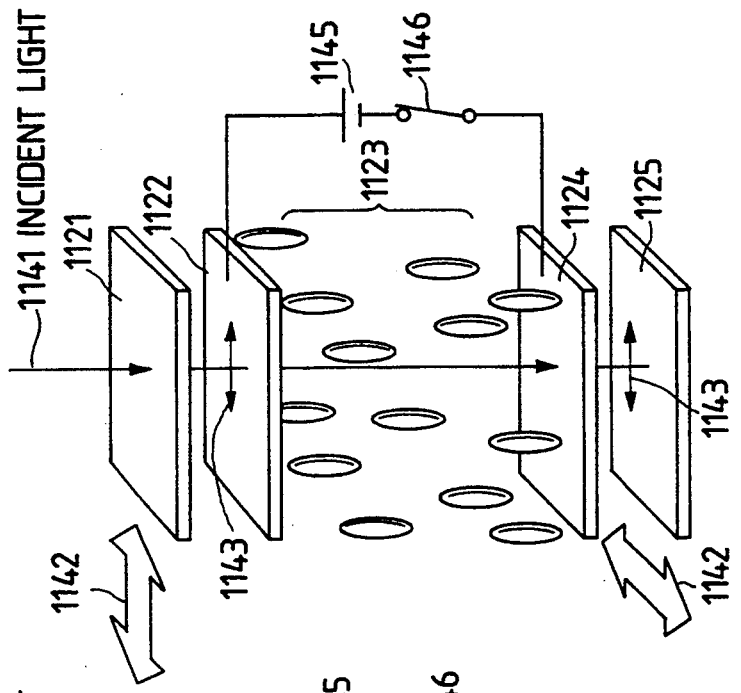
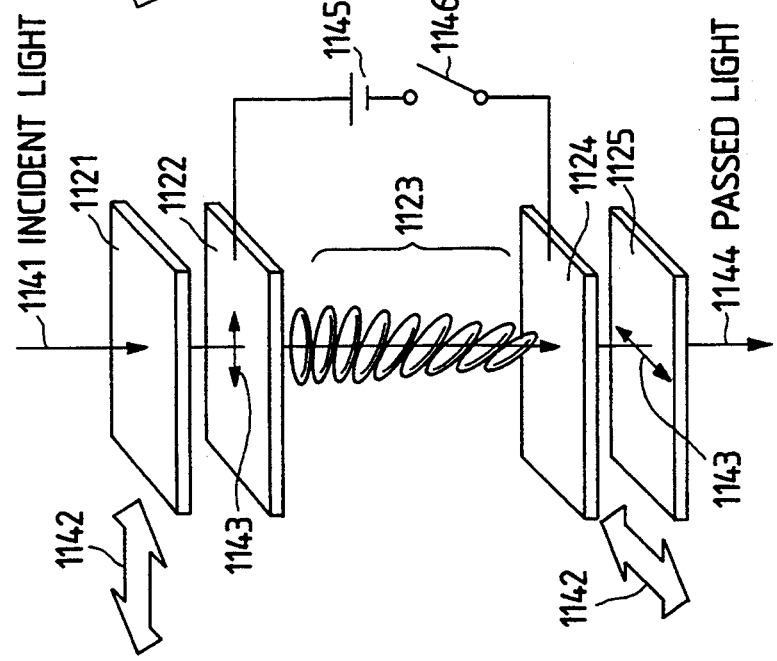

FLASH LIGHTING APPARATUS

This application is a continuation-in-part of application Ser. No. 07/891,158, filed May 29, 1992, (now abandoned).

BACKGROUND OF THE INVENTION

1. Field of the Invention

This invention relates to a flash lighting apparatus and a camera system in which the light distribution during flash emission can be controlled in conformity with the spatial distribution state of an object field.

2. Related Background Art

Heretofore, a flash lighting apparatus has been caused to emit light when the illuminance of an object field is deficient during photographing, thereby making up for the illuminance of the object field. The flash of this flash lighting apparatus substantially uniformly irradiates the object field, and the quantity of irradiation of the flash can be adjusted by TTL flash control. Accordingly, if the photographing distances of all objects in the object field are the same, flash photographing can be effected at proper exposure.

However, when in the object field, there are a plurality of objects differing in photographing distance, not all objects can be flash-photographed at proper exposure, but objects near to the camera become overexposed and objects far from the camera become underexposed.

In order to solve this problem, there has been proposed a flash lighting apparatus which has a plurality of flash emitting portions and in which the quantities of irradiation of the plurality of flash emitting portions are adjusted independently of one another, as disclosed in Japanese Laid-Open Patent Application No. 1-108538.

However, this flash lighting apparatus, which is provided with a plurality of flash emitting portions, is complicated in mechanism, and becomes more complicated in mechanism when the angle of irradiation is changed, and has suffered from a problem that the apparatus becomes bulky. Further, in the boundary portion between a plurality of irradiated areas corresponding to the plurality of flash emitting portions, there arises a problem that lights from the different flash emitting portions overlap one another or the irradiating light does not reach the object.

Also, each light emitting portion must be controlled on the basis of information from a plurality of photometry portions corresponding to the plurality of light emitting portions, and a high voltage is applied to each light emitting portion, and this has led to a problem that the electric circuit becomes complicated and consumed energy becomes enormous and generates high heat.

SUMMARY OF THE INVENTION

It is an object of the present invention to provide a flash lighting apparatus and a camera system which are capable of effecting proper lighting even when the photographing distances of a plurality of objects lying in an object field differ from one another.

It is another object of the present invention to provide a flash lighting apparatus and a camera system in which the projection principle can be adjusted for each of the plurality of areas of an object without the construction of an electric circuit being made so much complicated.

BRIEF DESCRIPTION OF THE DRAWINGS

FIGS. 14A and 14B illustrate the principle of the passage control by liquid crystal.

DESCRIPTION OF THE PREFERRED EMBODIMENTS

In the apparatus of the present invention, a plurality of passed light quantity control elements such as a plurality of light emitting ceramics (PLZT) or liquid crystal are disposed in an optical path from a light emitting portion toward an object field, and the quantity of irradiating light in each area is adjusted so that the exposure of a plurality of objects differing in photographing distance may become uniform. Specifically, as shown in FIG. 1, the object field is divided into three areas L, C and R, and three passed light quantity control elements are provided so as to individually adjust projected lights in these three areas, and the quantity of passed light in each area is controlled in conformity with the distance to the object existing in each area.

Now, where well-known PLZTs are used as the light quantity control elements, a PLZT bulk is sandwiched between transparent opposed electrodes and further, a polarizing plate is opposed to one of the electrodes and an analyzing plate is opposed to the other electrode, and the polarizing plate and analyzing plate are disposed with their axes of polarization made coincident with each other. When a predetermined voltage is applied between the opposed electrodes, incident light on the PLZT bulk has its axis of polarization rotated by 90° and emerges. Accordingly, light transmittance becomes approximately 100% when no voltage is applied, and light transmittance becomes approximately zero % when a voltage is applied.

Figure 1:
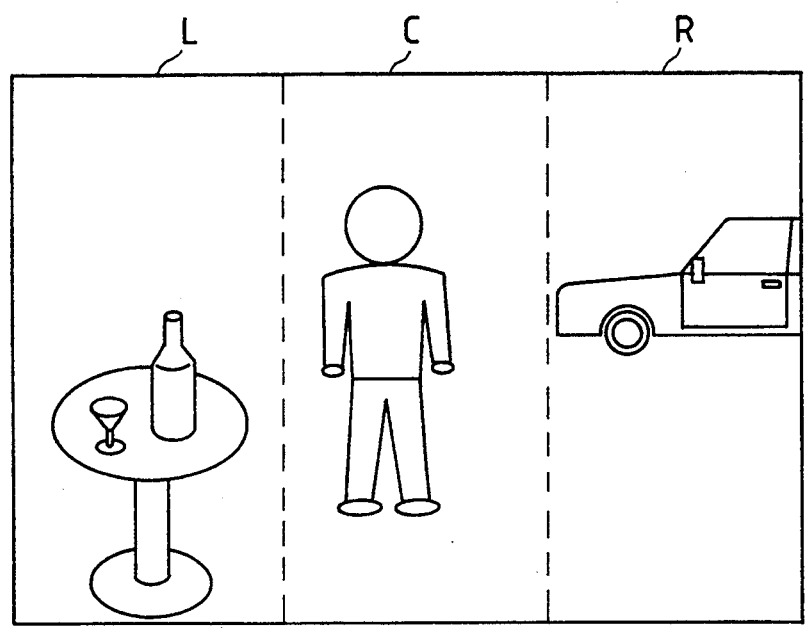
FIG. 1 shows that an object field is divided into three areas and the respective areas are illuminated independently of one another.

So, in the case of FIG. 1, the quantities of reflected light from objects existing, for example, in the three areas partitioned by dotted lines are photometered, and when the photometered values become predetermined values, a voltage is applied to the PLZT bulk to thereby render the light transmittance approximately zero, and the light distribution of the object field is adjusted. By doing this, the quantities of passed light in the areas L, C and R can be made different from one another.

However, the applied voltage to the PLZT bulk is required to be a higher voltage (several tens of volts to several hundreds of volts) than several volts to ten and several volts usually used as the voltage source of a camera. Therefore, a booster circuit may be indispensable like a flash apparatus.

[First Embodiment]

A first embodiment of the present invention will hereinafter be described with reference to FIGS. 2 to 8.

Figure 2:
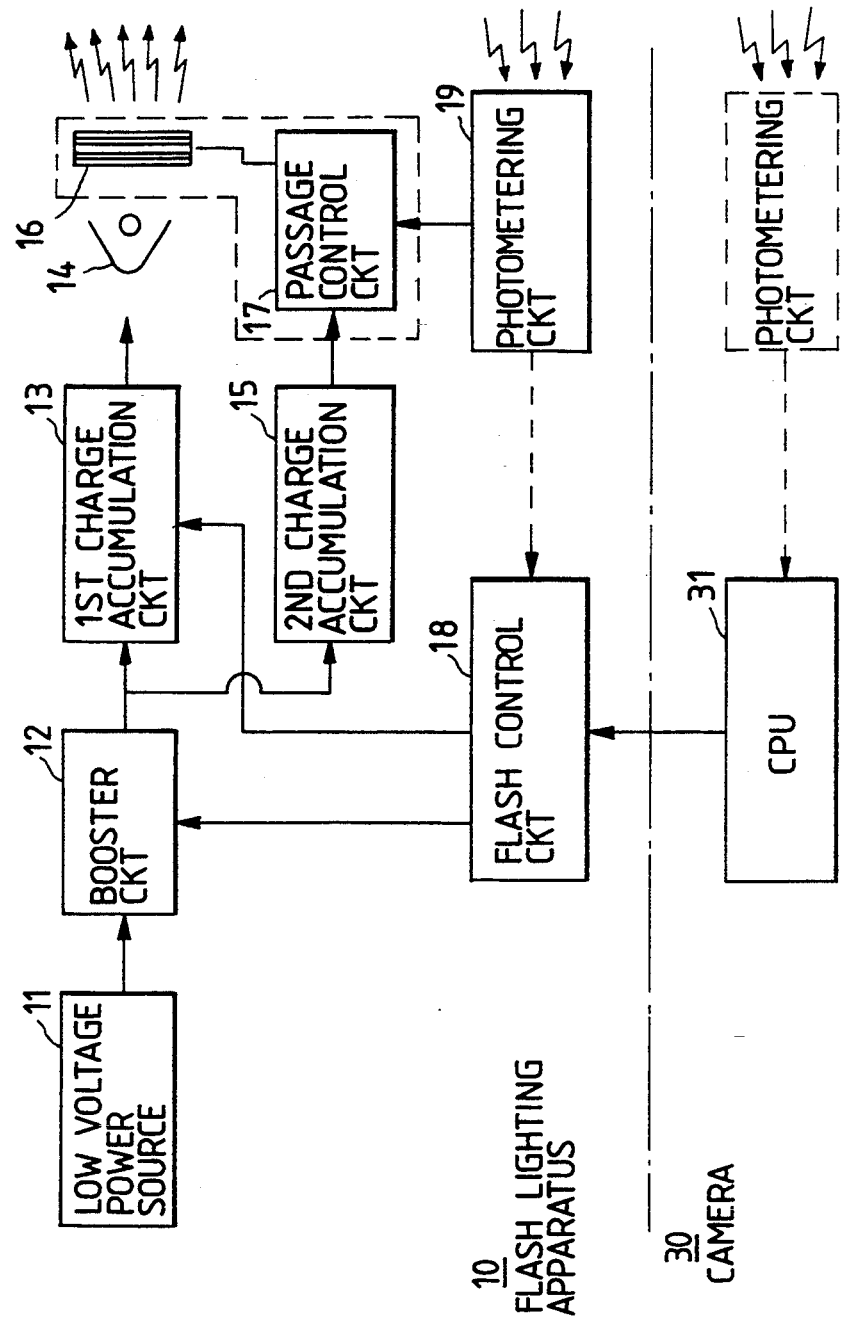
FIG. 2 is a block diagram showing the general construction of a first embodiment of the present invention.

Referring to FIG. 2 which is a control block diagram of a camera provided with a flash lighting apparatus, the reference 10 designates a flash lighting apparatus, and the reference numeral 30 denotes a camera on or to which the flash lighting apparatus is carried or connected.

The flash lighting apparatus 10 is provided with a low voltage power source 11 for producing a low voltage, a booster circuit 12 for boosting the low voltage produced from the low voltage power source 11 to a high voltage, a first charge accumulation circuit 13 for accumulating therein electrical energy produced by the booster circuit 12, and a light emitting portion 14 emitting light by the electrical energy accumulated in the first charge accumulation circuit 13. The flash lighting apparatus 10 is further provided with a second charge accumulation circuit 15 for accumulating therein the electrical energy produced by the booster circuit 12, a light distribution control element 16 disposed in the passage optical path of flash projected outwardly from the light emitting portion 14 for adjusting the quantity of passed light therethrough in conformity with a high voltage applied from the second charge accumulation circuit 15, a passage control circuit 17 for the light distribution control element 16, a flash control circuit 18 for the light emitting portion 14, and a photometering circuit 19 for receiving and photometering reflected light from an object. The flash control circuit 18 receives a flash starting command from the CPU 31 of the camera side and causes the light emitting portion 14 to emit light. The light distribution control element 16 is comprised of a plurality of passed light quantity control portions which will be described later.

Figure 3:
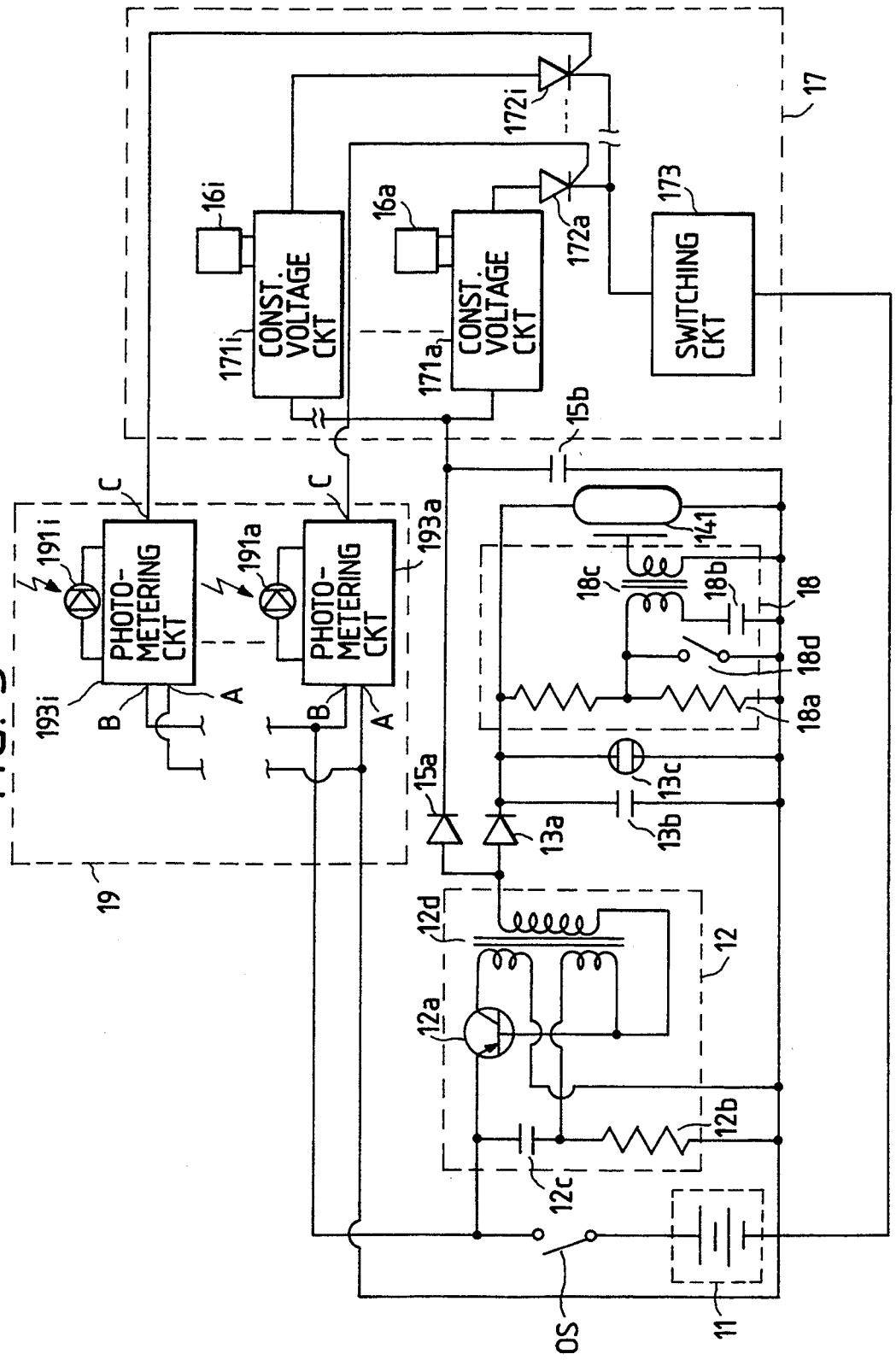
FIG. 3 is a circuit diagram showing the details of some portions of FIG. 2.

FIG. 3 shows the details of the constituents of FIG. 2. The low voltage power source 11 is comprised of a DC power source such as a battery, and is designed to supply electric power to the booster circuit 12, etc. when the switch 10S of the flash lighting apparatus 10 is closed. The booster circuit 12, as is well known, comprises a transistor 12a, a resistor 12b, a capacitor 12c, an oscillation transformer 12d, etc., and boosts the low voltage of the battery 11 to several tens of volts to several hundreds of volts and outputs it.

The first charge accumulation circuit 13 is comprised of a diode 13a for rectifying the high voltage boosted by the booster circuit 12, a first capacitor 13b charged with the rectified high voltage, and a neon tube 13c adapted to be turned on when the charging potential of the first capacitor 13b assumes a predetermined value or higher. The second charge accumulation circuit 15 is provided in parallel to the first charge accumulation circuit 13, and comprises a diode 15a for rectifying the high voltage boosted by the booster circuit 12, and a second capacitor 15b charged with the rectified high voltage.

The flash control circuit 18, as is well known, comprises a resistor 18a, a trigger capacitor 18b, a trigger transformer 18c and a trigger switch 18d adapted to be closed by a light emission starting signal from the camera side, and when the trigger switch 18d is closed, the trigger capacitor 18b discharges and a high voltage is produced on the secondary side of the trigger transformer 18c and triggers the flash tube 141 of the light emitting portion 14.

Figure 4:
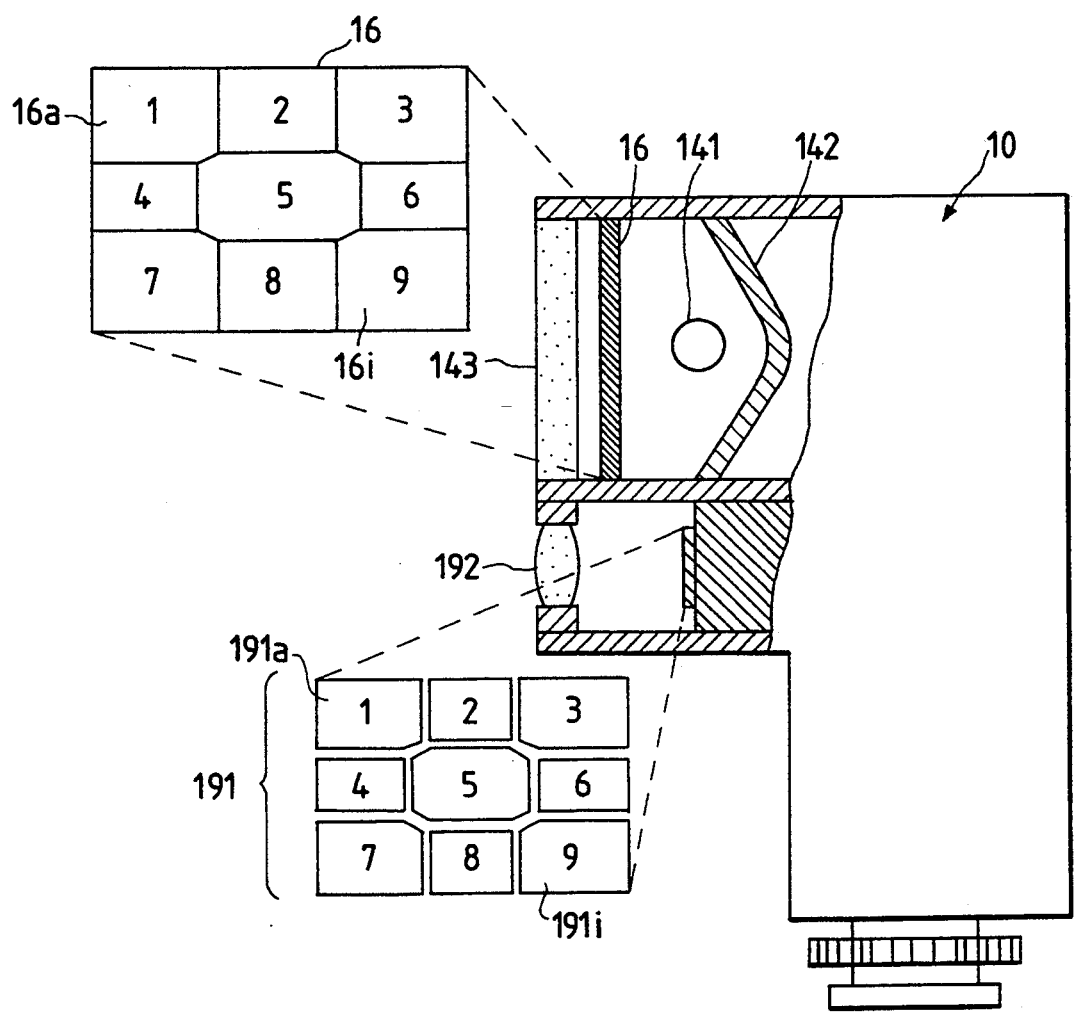
FIG. 4 shows the external appearance of a flash lighting apparatus according to the first embodiment.

FIG. 4 is a detailed view showing the interior of the light emitting portion 14 of the flash lighting apparatus 10. This light emitting portion 14 has a flash tube 141, a reflector 142 and a light distributing lens 143, and the light distribution control element 16 is provided in the optical path of flash reflected by the reflector 142 and projected outwardly. Also, in the light emitting portion 14, there are provided a photometry element 191 divided into nine as will be described later, and a lens 192 for causing reflected light from the object to enter the photometry element 191.

The light distribution control element 16 is comprised of a plurality of light-transmitting ceramics (PLZT) or liquid crystal, and as shown in FIG. 4, the light distribution control element 16 is divided into nine areas 1–9 correspondingly to the areas of the object field divided into nine. These nine areas 1–9 substantially correspond to the nine divided areas of the photometry element 191. Passed light quantity control portions corresponding to the areas 1–9 are designated by 16a–16i, and photometry elements corresponding to the areas 1–9 are denoted by 191a–191i.

Figure 5A:
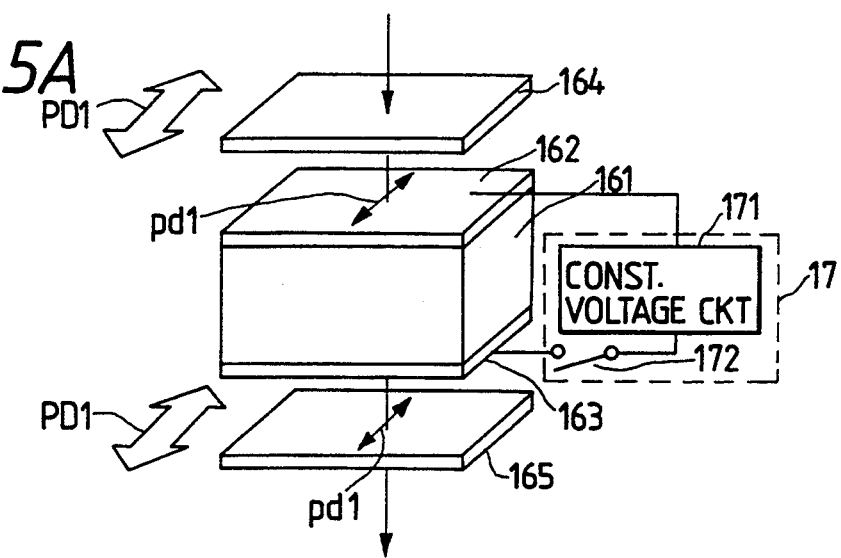
FIGS. 5A and 5B are perspective views illustrating the principle of light transmitting ceramics constituting a passed light quantity control element.
Figure 5B:
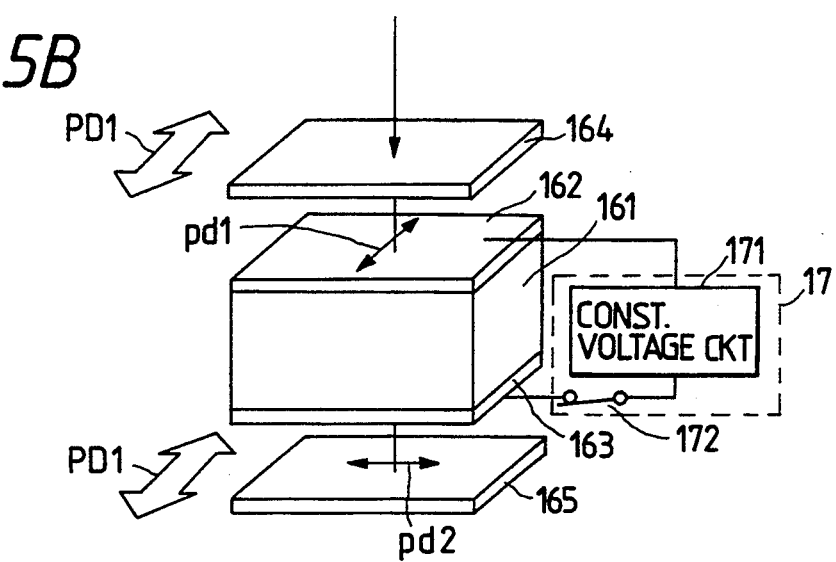

FIGS. 5A and 5B illustrate the principle and construction of the light-transmitting ceramics provided correspondingly to the nine areas. A bulk 161 of PbLa(ZrTi)O$_3$ is used as PLZT, and transparent electrodes 162 and 163 are provided on the upper and lower surfaces, respectively, of the bulk 161, and a polarizing plate 164 and an analyzing plate 165 are provided in opposed relationship with those transparent electrodes 162 and 163, respectively. As shown in FIG. 5A, the axes of polarization PD1 of the polarizing plate 164 and analyzing plate 165 are made coincident with each other.

In FIG. 2, the light transmittance of the light distribution control element 16 is controlled by the passage control circuit 17. This passage control circuit 17, as shown in FIGS. 5A and 5B, comprises a constant voltage circuit 171 and a switch 172, and the constant voltage circuit 171 and switch 172 are provided in series between the transparent electrodes 162 and 163, and when the result of photometry in each area reaches a predetermined value, the switch 172 is closed and a constant voltage is applied to the PLZT 161. When a high voltage is applied to the PLZT 161, the refractive index thereof varies, whereby the optical phase difference of the incident light is varied and output light is polarized. Accordingly, if the incident light on the PLZT 161 of which the axis of polarization is pd1 is polarized and caused to emerge in a direction pd2 indicated in FIG. 5B when the switch 172 is closed and the constant voltage is applied to the PLZT 161, the direction of polarization of the analyzing plate 165 and the direction of polarization of the emergent light from the PLZT 161 deviate by 90° from each other and therefore, the light transmittance becomes approximately zero.

When no voltage is applied to the PLZT 161, the emergent light from the PLZT 161 creates no optical phase difference relative to the incident light and therefore, as shown in FIG. 5A, both of the axes of polarization of the incident light and the emergent light are pd1 and the light transmittance becomes approximately 100%. Also, by adjusting the applied voltage, the light transmittance can be suitably adjusted, but in the present embodiment, control is only effected as to whether a predetermined voltage is applied or not, that is, whether the light transmittance is rendered into 100% or approximately zero.

As described above, the constant voltage circuit 171 and switch 172 form a part of the passage control circuit 17. That is, as shown in FIG. 3, the passage control circuit 17 is provided with constant voltage circuits 171a–171i provided correspondingly to the passed light quantity control portions 16a–16i, respectively, of the above-described nine areas, and thyristors 172a–172i connected to the constant voltage circuits 171a–171i, respectively, and adapted to be opened until a high level signal is output from each terminal C of the photometering circuit 19, to thereby prevent the constant voltage from being applied to the PLZT, and to be closed when the high level signal is output, to thereby permit the constant voltage to be applied to the PLZT. The passage control circuit 17 further has a switching circuit 173 for resetting the thyristors 172a–172i.

Figure 6:
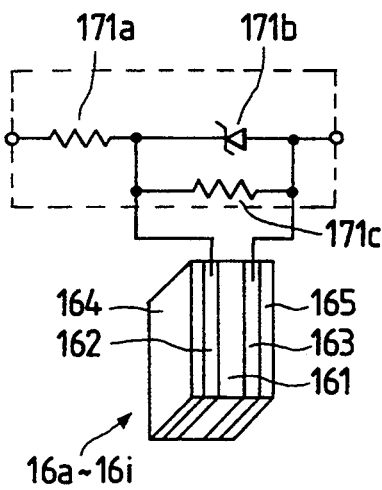
FIG. 6 shows a constant voltage circuit in the first embodiment which is connected to the light transmitting ceramics.

The constant voltage circuits 171a–171i connected to the passed light quantity control portions 16a–16i, respectively, are constructed as shown, for example, in FIG. 6. In FIG. 6, a resistor 171a and a Zener diode 171b are disposed in series between the two terminals of the second capacitor 15b, and a resistor 171c is connected in parallel to the Zener diode 171b. By such a circuit construction, it never happens that the applied voltage is fluctuated by the voltage fluctuation of the second capacitor 15b, and the light transmittance can be adjusted stably.

Figure 7A:
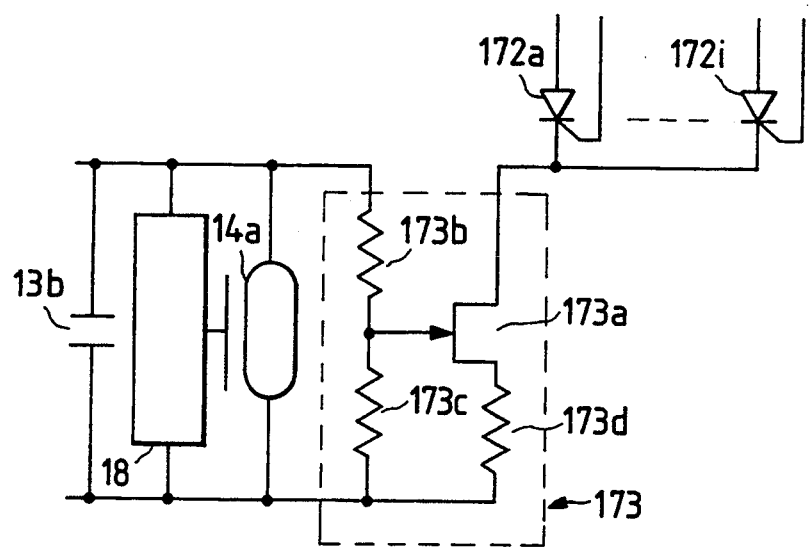
FIGS. 7A and 7B diagrammatically show a circuit in the first embodiment for resetting a thyristor.

The switching circuit 173, as shown in FIG. 7A, is provided with a junction type FET 173a having its drain connected to the cathodes of the thyristors 172a–172i and having its source connected to the ground line through a resistor 173d, and resistors 173b and 173c for controlling the gate voltage of the junction type FET 173a by the voltage between the two terminals of the first capacitor 13b. At the start of the light emission of the flash tube 141, the voltage between the two terminals of the first capacitor 13b is high and therefore, the junction type FET 173a is turned on and the light emission progresses and thus, the voltage between the two terminals of the first capacitor 13b drops. Thereupon, the voltage applied to the resistor 173c also drops, and when the voltage applied to the gate of the junction type FET 173a drops to a threshold value level, the junction type FET 173a is turned off. By the junction type FET 173a being turned off, all of the nine thyristors 172a–172i are reset.

Also, in FIG. 3, the photometering circuit 19 is provided with nine photometry elements 191a–191i such as silicon photodiodes corresponding to the areas of the light distribution control element 16 divided into nine areas as shown in FIG. 4, and photometering circuits 193a–193i for detecting by photometry signals from the photometry elements 191a–191i that the quantities of light of objects existing in the respective areas assume a predetermined value.

Figure 8:
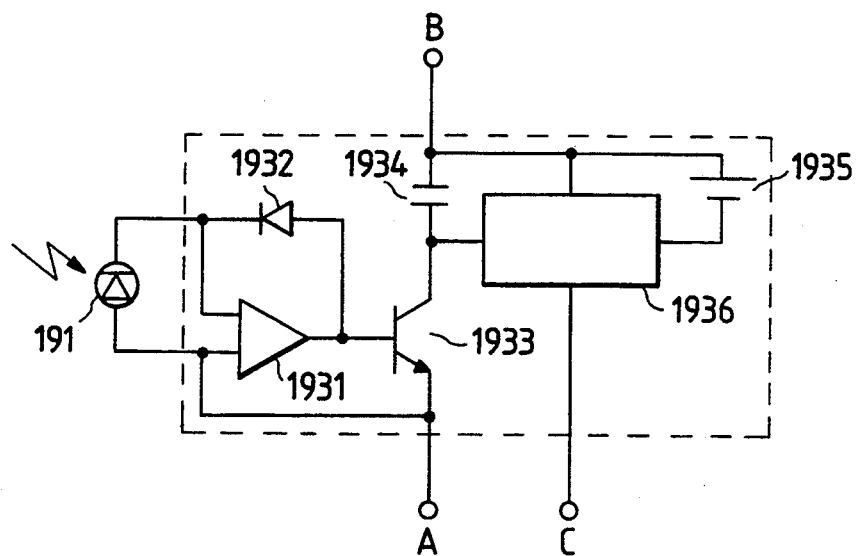
FIG. 8 is a diagram showing a photometry circuit in the first embodiment.

FIG. 8 shows the details of the photometering circuits 193a–193i, each of which comprises an operational amplifier 1931, a diode 1932, a transistor 1933 ON-OFF-controlled by the output of the operational amplifier 1931, a capacitor 1934 for integrating the electric current from the low voltage power source 11 flowing between terminals B and A when the transistor 1933 is conductive, and a comparator 1936 for comparing a reference voltage 1935 with the voltage between the two terminals of the capacitor 1934 and outputting a high level signal to a terminal C when the voltage between the two terminals of the capacitor exceeds the reference voltage.

A description will now be given of the operation of the flash lighting apparatus constructed as described above. For the simplification of the description, a case where the object field is divided into three as shown in FIG. 1 will be described.

The passed light quantity control portion corresponding to the left area L is defined as 16L, the passed light quantity control portion corresponding to the central area C is defined as 16C, and the passed light quantity control portion corresponding to the right area R is defined as 16R, and likewise, the photometry element corresponding to the left area L is defined as 191L, the photometry element corresponding to the central area C is defined as 191C, and the photometry element corresponding to the right area R is defined as 191R. The other portions will also be described with L, R and C attached thereto.

When the switch 10S of the flash lighting apparatus 10 is closed, the low voltage of the low voltage power source 11 is supplied to the booster circuit 12, by which it is boosted to a high voltage of e.g. about 100 volts. The high voltage from this booster circuit 12 is rectified by the diode 13a and charges the first capacitor 13b, and also is rectified by the diode 15a and charges the second capacitor 15b. When the first capacitor 13b is fully charged, the neon tube 13c is turned on. At this time, the trigger switch 18d of the flash control circuit 18 is opened and the flash tube 141 is not triggered and therefore, the flash tube 141 does not emit light.

On the other hand, the second capacitor 15b is also fully charged, but the output terminals C of the photometering circuits 193L–193R are at a low level and the thyristors 172L–172R are closed and therefore, no voltage is applied to each PLZT 161 and the light entering the passed light quantity control portions 16L–16R is in a state in which it can intactly emerge.

When photographing is started by the operation of a release button and a flash starting signal is output from the CPU 31 of the camera 30, the switch 18d of the flash control circuit 18 is closed and a high voltage is produced on the secondary side of the trigger transformer 18c and triggers the flash tube 141. Since the voltage charged in the first capacitor 13b is applied between the two terminals of the flash tube 141, flashing is started by such triggering. The light emitted from the flash tube 141 is reflected by the reflector 142, and passes through the passed light quantity control portions 16L–16R and illuminates the object. At this time, the light transmittance of each of the passed light quantity control portions 16L–16R is 100%. The reflected light from the object passes through the lens 192 to the photometry elements 191L, 191C and 191R.

The transistors 1933 of the photometering circuits 193L–193R are rendered conductive by the photometry signals from the photometry elements 191L–191R and the capacitor 1934 is charged. Assuming that the reflectances of the objects in the areas L, C and R are substantially equal to one another, the photocurrent of the photometry element 191L which receives the reflected light from the object in the closest area L is highest, and the photocurrent of the photometry element 191C and the photocurrent of the photometry element 191R are next highest in the named order. Accordingly, the voltage between the two terminals of the capacitor 1934 of the photometering circuit 193L corresponding thereto becomes higher than the voltage of the reference voltage source 1935 at first. As a result, the comparator 1936 of the photometering circuit 193L outputs a high level signal to the terminal C. Thereby the thyristor 172L is turned on and the voltage of the second capacitor 15b is applied to the PLZT 161 corresponding to the area L, and the light transmittance of the passed light quantity control portion 16L becomes approximately zero and thus, the application of the illuminating light to the area L is stopped. When the photometering circuit 193C corresponding to the area C then detects a predetermined quantity of light, the light transmittance of the passed light quantity control portion 16C becomes zero, and when the photometering circuit 193R corresponding to the area R finally detects a predetermined quantity of light, the light transmittance of the passed light quantity control portion 16R becomes zero.

Thereafter, the charge in the first capacitor 13b drops below a predetermined value and the light emission of the flash tube 141 is stopped. Also, when the voltage between the two terminals of the first capacitor 13b becomes lower than a predetermined value, the junction type FET 173a of the switching circuit 173 is turned off and the thyristors 172L–172R are turned off.

According to such an embodiment, the second capacitor 15b for accumulating therein the electrical energy to be applied to the PLZT 161 is charged by the booster circuit 12 like the first capacitor 13b for flashing and therefore, it is not necessary to provide a booster circuit or the like exclusively for that purpose and thus, the circuit construction can be simplified.

Figure 7B:
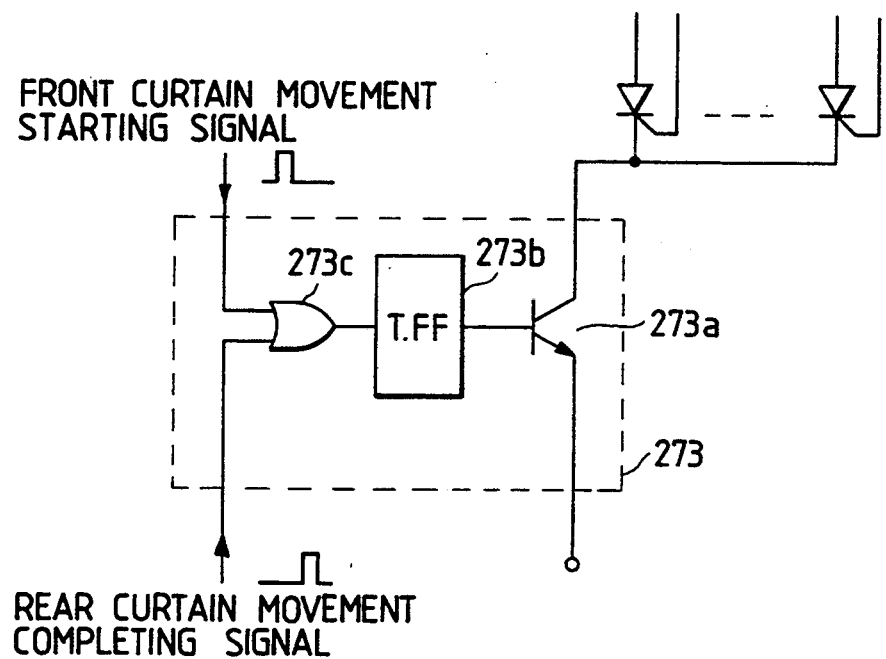

The design may also be such that the thyristors 172a–172i are reset by a switching circuit 273 as shown in FIG. 7B.

In FIG. 7B, a transistor 273a is provided between the cathode and the ground line of each thyristor and this transistor 273a is turned on and off by a T type flip-flop 273b. The output of an OR gate 273c is connected to the T type flip-flop 273b, and a pulse signal from a switch adapted to be closed when the front curtain of a shutter starts to move and a pulse signal from a switch adapted to be closed when the rear curtain of the shutter terminates its movement are connected to the OR gate 273c.

In such a switching circuit 273, by the pulse when the front curtain starts to move, the output of the T type flip-flop 273b changes from 0 to 1 and the transistor 273a is turned on, and by the pulse when the rear curtain terminates its movement, the output of the T type flip-flop 273b changes from 1 to 0 and the transistor 273a is turned off. When flash photographing is thus terminated, the thyristors 172a–172i can be reset.

In the foregoing, the object field is divided into nine and correspondingly thereto, the flash control area is also divided into nine, but alternatively, may be divided into less or more than nine.

Also, in the foregoing, the quantity of reflected light from the object is photometered and when the value thereof reaches a predetermined value or greater, the light transmittance of the passed light quantity control portion is rendered into approximately 100% to zero %, but the present invention can also be applied to an apparatus in which the distance to each object is found in advance and the light transmittance is controlled before the start of light emission so as to be made lower for nearer objects. Likewise, the present invention can also be applied to an apparatus in which irrespective of the distance, light is emitted prior to photographing and the quantity of reflected light in each area is measured and by the result thereof, the light transmittance of each area is preset.

Further, a bulk type electro-optical modulation element such as $KH_2PO$, $NH_4H_2PO_4$ and $Bi_{12}SiO_{20}$ may be used instead of PLZT. Furthermore, use can be made of a bulk type electro-optical modulation element to which a voltage is not applied in the same direction as the direction of travel of light as in PLZT but a voltage is applied in a direction orthogonal to the direction of travel of light. As a typical material for it, mention may be made of $LiNBO_3$, $LiTa_3$, $BaNaNb_5O_{15}$, $Sr_xBa_{1-x}Nb_2O_6$, $PbOxNbO_3$ or the like (x being an arbitrary number). In this case, the transparent electrodes are unnecessary.

Also, in the foregoing, the light beam reflected by the reflector has its quantity of light controlled in each area by the passed light quantity control portion, but the reflecting surface of the reflector may be divided into a plurality of areas in the same manner as described above and the reflectance of each divided area may be varied and controlled. In such case, if an element such as an electrochromic device (ECD) is used as the reflecting surface, the control of the reflectance thereof will be possible.

Now, in the above-described embodiment, there is the possibility that great irregularity occurs in the distribution of the light applied to the object field in conformity with the difference in quantity of light between the areas corresponding to the plurality of passed light quantity control portions. A description will now be given of a second embodiment of the present invention which is designed to mitigate such irregularity.

[Second Embodiment]

The second embodiment of the present invention has a plurality of main control portions for effecting the control of the passage of quantity of light, and at least one sub-control portion which is adjacent to at least two main control portions and is designed such that the quantity of light passed through the sub-control portion is between the maximum value and the minimum value of the quantity of light passed through the main control portions adjacent thereto. Accordingly, in the second embodiment, great irregularity occurring in the distribution of flash in the object field can be mitigated. The second embodiment differs in the construction of the light distribution control element and the passage control circuit from the first embodiment.

Figure 9:
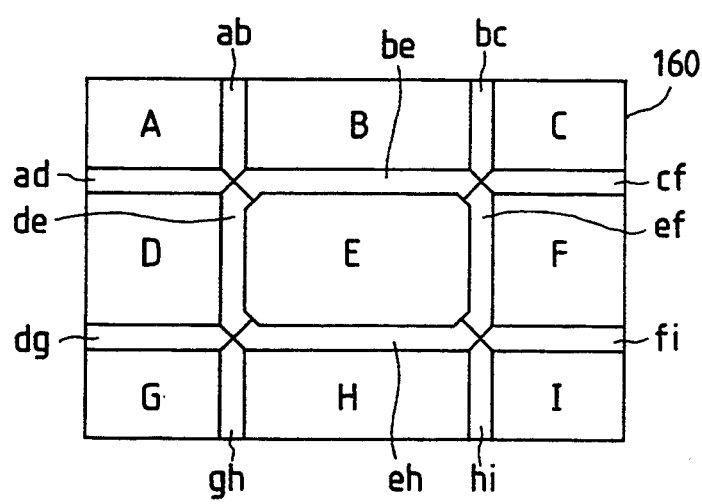
FIG. 9 shows the state of the division of a light distribution control element in a second embodiment of the present invention.

FIG. 9 shows the construction of the light distribution control element 160. Twelve sub-control portions 160ab, 160be, 160bc, 160ad, 160cf, 160de, 160ef, 160dg, 160gh, 160eh, 160hi and 160fi are provided among nine main control portions 160A, 160B, 60C, 160D, 160E, 160F, 160G, 160H and 160I, and the sub-control portions are designed to be operated by the result of first photometry in the main control portions proximate thereto.

The present embodiment adopts the number of divisions and the method of division as described above, but if the number of the main control portions is two or more and the number of the sub-control portions is one or more, at least the effect intended by the present invention will be created.

Figure 10:
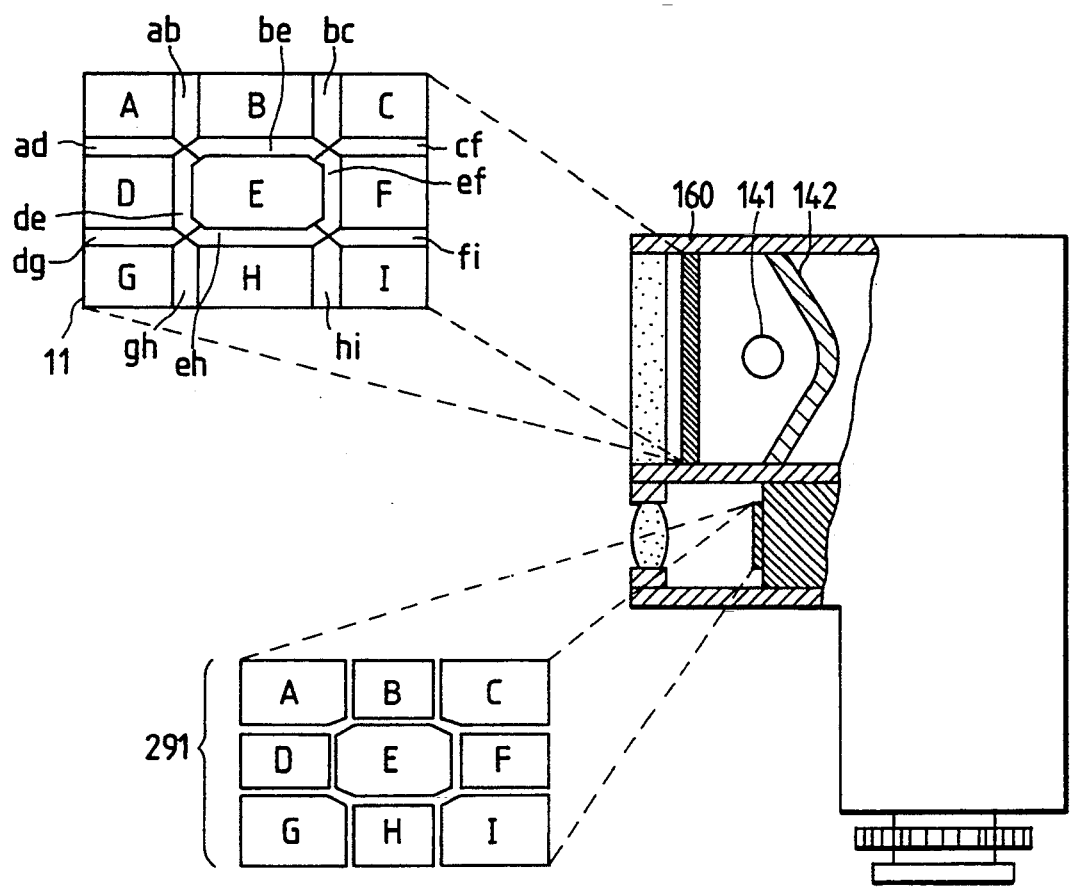
FIG. 10 shows the external appearance of a flash lighting apparatus according to the second embodiment.

FIG. 10 shows a flash lighting apparatus according to the second embodiment. A light emitting tube 141, a reflecting mirror 142, a passage control plate and a silicon photodiode 291 are the same in construction as those in the first embodiment. The light distribution control element 160 is constructed as shown in FIG. 9.

Figure 11:
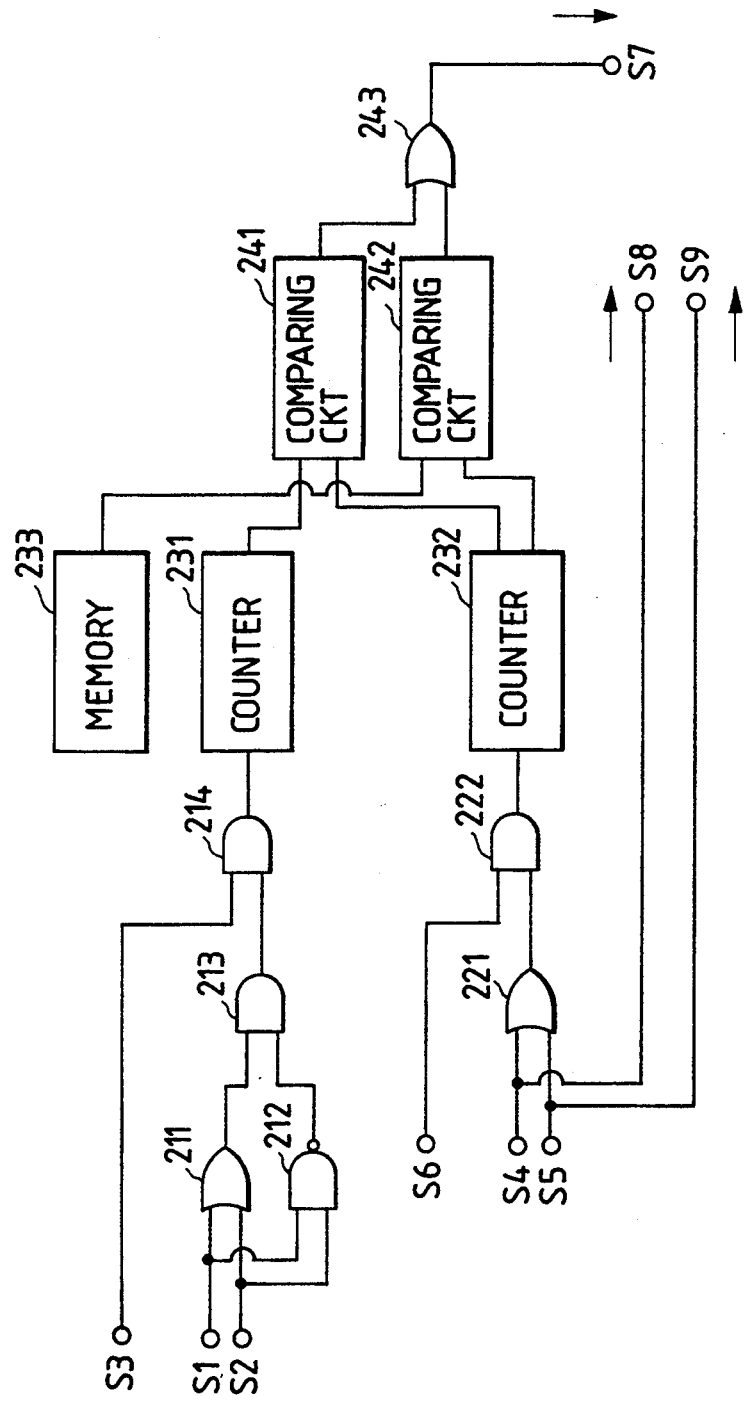
FIG. 11 is a circuit diagram showing some portions of a passage control circuit in the second embodiment.

FIG. 11 is a schematic diagram of some portions of the passage control circuit in the second embodiment, and FIG. 11 shows a circuit for controlling the operations of the main control portions 160A, 160B and the sub-control portion 160ab.

When the photometering area A of the silicon photodiode 291 reaches a first exposure amount, a positive voltage S1 is input, and when the photometering area B of the silicon photodiode 291 reaches the first exposure amount, a positive voltage S2 is input. The output of an AND circuit 213 is such that as shown in FIG. 11, a positive voltage is produced by an OR circuit 211 and a NAND circuit 212 for the time from the inputting of the positive voltage S1 till the inputting of the positive voltage S2 or from the inputting of the positive voltage S2 till the inputting of the positive voltage S1. An AND circuit 214 inputs a clock pulse S3 and therefore, a counter circuit 231 measures and memorizes the difference between the times when the two photometering areas A and B reach the first exposure amount as a pulse number.

Second photometry is then effected and when a second exposure amount greater than the first exposure amount is reached, a positive voltage is input to the passage control circuit. When the photometering area A reaches the second exposure amount, a positive voltage S4 is applied to an OR circuit 221 and S4 is output as a signal S8 to the main control portion 160A. When the photometering area B reaches the second exposure amount, a positive voltage S5 is applied to the OR circuit 221 and S5 is input as a signal S9 to the main control portion 160B. By the positive voltage S8 being input, the transmittance of the main control portion 160A is reduced to approximately zero, and by the positive voltage S9 being input, the transmittance of the main control portion 160B is reduced to approximately zero. Also, an AND circuit 222 receives as inputs the output of the OR circuit 221 and a clock pulse S6, and inputs the pulse number to a counter circuit 232. When the pulse number being counted by this counter circuit 232 reaches the number memorized in the counter 231, a positive voltage is produced by a comparing circuit 241, and this positive voltage provides a passage control signal for reducing the transmittance of the sub-control portion 160ab to approximately zero.

Also, there is a case where the object is at a very distant location and the photometering area A or B does not reach the first exposure amount, and therefore, the is also such that a predetermined value is stored in a memory 233 and when the counter 232 reaches the value of the memory 233, a positive voltage is produced by a comparing circuit 242.

As described above, the outputs from the comparing circuit 241 and the comparing circuit 242 are input to an OR circuit 243 and when the value of the counter 232 reaches the value of the counter 231 or the memory 233, a positive voltage S7 is output from the OR circuit 243 to the sub-control portion 160ab, and the transmittance of the sub-control portion 160ab is reduced to approximately zero.

The difference between the times when two different areas reach a certain exposure amount becomes greater as the exposure amount becomes greater and therefore, the difference between the times when S1 and S2 by the first photometry are input is smaller than the difference between the times when S4 and S5 by the second photometry are input. Thus, according to the above-described construction, the time when the sub-control portion 160ab starts to be driven can be between the time when the main control portion 160A starts to be driven and the time when the main control portion 160B starts to be driven.

The construction shown in FIG. 11 is one for making a signal for controlling the operation of the sub-control portion ab, and a similar construction can be adopted for the remaining plurality of sub-control portions.

The circuit of FIG. 11 is an example, and other circuit may be adopted if calculation can be done so that the sub-control portion ab can be driven between the time when the main control portion A of the light distribution control element starts to be driven and the time when the main control portion B starts to be driven.

Figure 12:
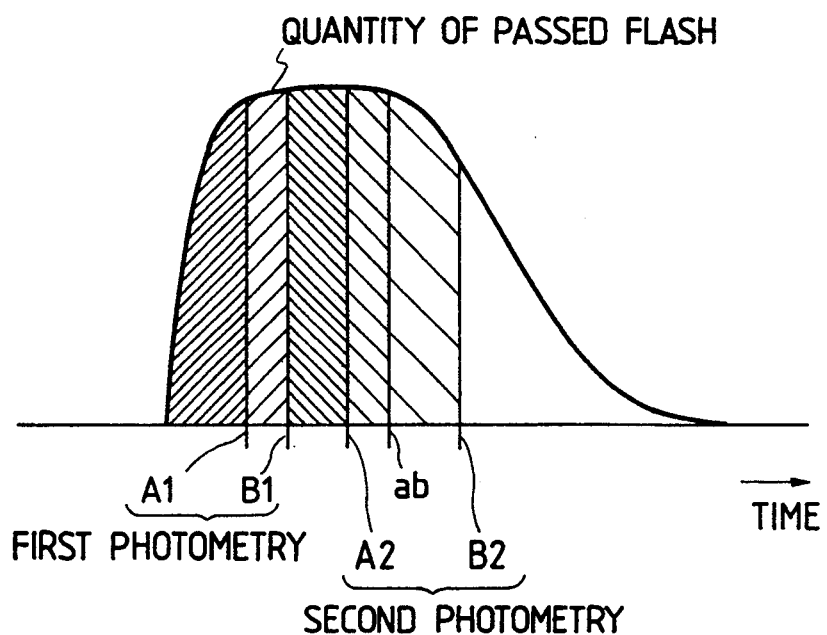
FIG. 12 is a graph showing the relations between the quantity of flash in the second embodiment and the periods of photometry and passage control driving.

FIG. 12 shows the relation between time and the quantity of passed flash when reflected light is more in the photometering area A than in the photometering area B, that is, there is a near object in the object field area corresponding to the photometering area A. The times when the first exposure amounts of the photometering areas A and B by the first photometry are reached are indicated as A1 and B1, respectively, the times when the main control portions A and B of the light distribution control element 160 start to be driven by the second photometry are indicated as A2 and B2, respectively, and the time when the sub-control portion ab of the light distribution control element 160 calculated from the result of the first photometry starts to be driven is indicated as ab.

In the circuit of FIG. 11, the clock pulses input from S3 and S6 are the same and therefore, the time A1-B1 and the time A2-ab become the same. However, if the speeds of the two clock pulses are changed, the time A1-B1 and the time A2-ab can be changed and suitable adjustment becomes possible.

Figure 13:
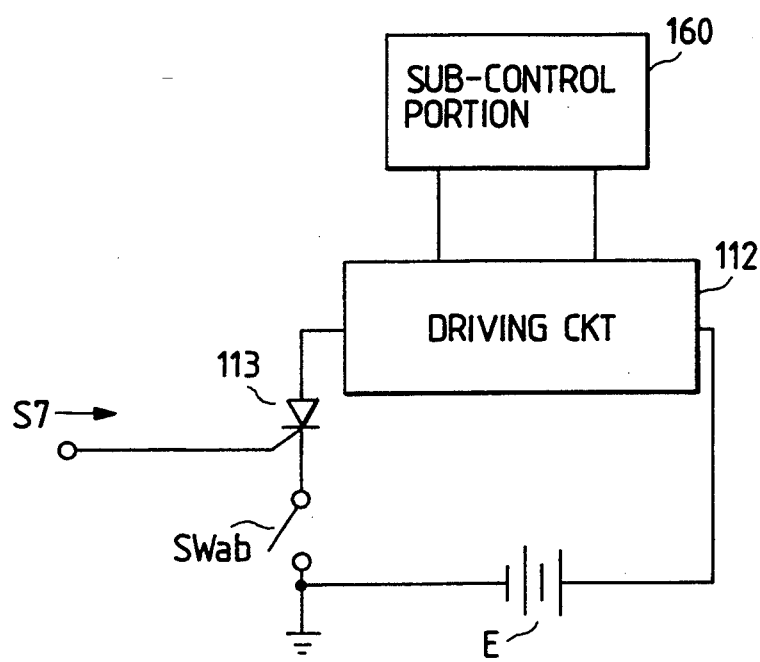
FIG. 13 is a diagram showing a drive circuit for the passage control portion in the second embodiment.

FIG. 13 is a diagram showing the sub-control portion ab of the second embodiment and a portion of the passage control circuit for driving it. If a thyristor 113a b is rendered conductive by the positive voltage output to S7 of the circuit of FIG. 11 and a switch SWab is closed, a driving circuit 112ab drives the sub-control portion 160ab by the conduction of the thyristor 113ab. At the moment of the conduction of the thyristor 113ab, a source voltage E is applied to the driving circuit 112ab, and the driving circuit 112ab converts the source voltage so that the sub-control portion 160ab can be suitably driven. For example, where the sub-control portion is PLZT, the driving circuit 112ab boosts the source voltage E to a half-wavelength voltage for changing the optical phase difference of incident light by $\pi$. Where the sub-control portion is liquid crystal, the driving circuit 112ab converts the DC voltage E into an AC voltage. Where the sub-control portion is an ECD element, the driving circuit 112ab converts the DC voltage E into a voltage by which the ECD layer can be colored. Herein, the sub-control portion 160ab has been shown, but the construction of a circuit for driving the remaining sub-control portions and the main control portions is the same as that described above.

FIGS. 14A and 14B illustrate the principle of passage control when torsional nematic type liquid crystal is used. The torsional nematic type liquid crystal has the property of rotating a plane of polarization. Accordingly, if as shown in FIGS. 14A and 14B, a polarizing plate 1121 and an analyzing plate 1125 are disposed with their axis of polarization 1142 turned by 90° and the nematic liquid crystal is made by being twisted by 90°, when no voltage is applied, incident light which is linearly polarized light provided by passing through the polarizing plate is optically rotated and output as linearly polarized light in a direction perpendicular to the incident light. Therefore, it becomes possible for this light to pass through the analyzing plate. However, when a voltage is applied, the liquid crystal becomes oriented in a direction perpendicular to the polarizing plate and analyzing plate by an electric field and therefore the light cannot be optically rotated and cannot pass through the analyzing plate. In the present embodiment, the torsional nematic type liquid crystal has been shown, but liquid crystal of other type such as the guest-host type will likewise act if the light can be passage-controlled by the ON and OFF of a voltage.

Figure 15:
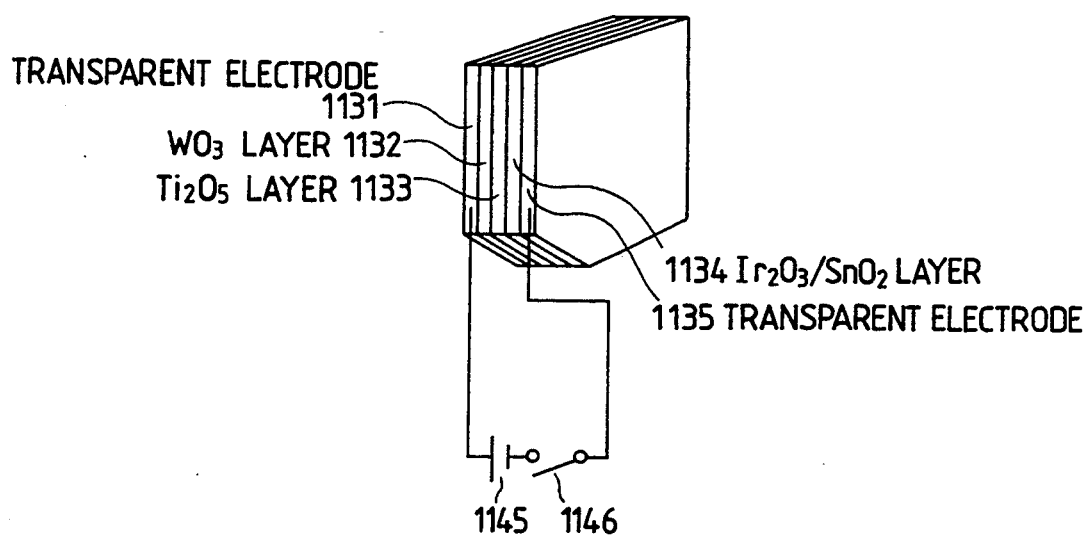
FIG. 15 is a cross-sectional view when an ECD element is used as a light distribution control element.

FIG. 15 shows a cross-sectional view of the light distribution control element when an ECD is used. The ECD, as is disclosed in Japanese Laid-Open Utility Model Application No. 2-138719, has the property of being colored when a voltage is applied thereto, and this property is utilized for light control. In the cross-section of the area of each light distribution control element, a transparent electrode 1131, an EC layer 1132, solid electrolyte layers 1133 and 1134 and a transparent electrode 1135 are arranged from the direction of the light emitting portion. When in such a construction, a voltage is applied between the transparent electrodes, the ECD is colored between the transparent electrodes by oxidation reduction reaction, whereby the light can be passage-controlled. In the present embodiment, $WO_3$ is used as the EC layer and $Ta_2O_5$ and $Ir_2O_3/SnO_2$ are used as the solid electrolyte layers, and the $WO_3$ layer, the $Ta_2O_5$ layer and the $Ir_2O_3/SnO_2$ layer are arranged from the incident light side. As the solid electrolyte layers, use can also be made of $SiO_2$, $Cr_2O_3$, etc.

Figure 16:
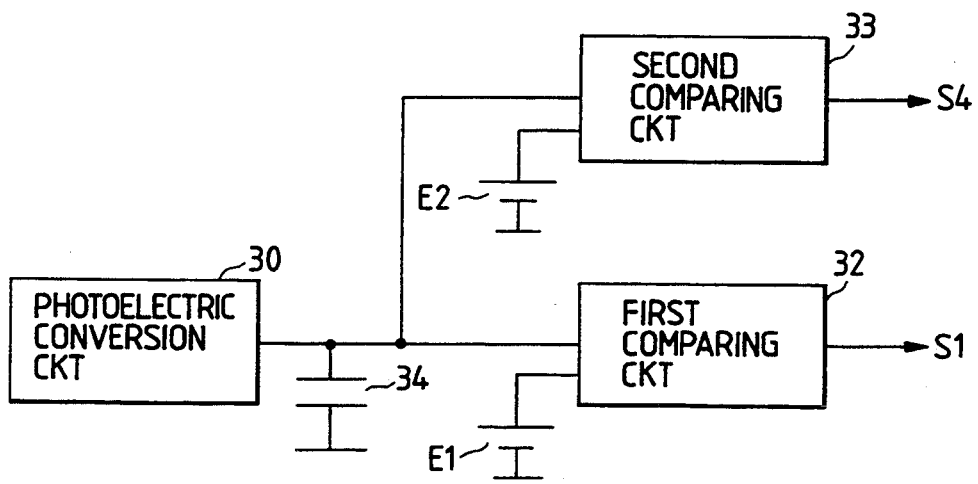
FIG. 16 is a block diagram showing some portions of a photometering circuit in the second embodiment.

FIG. 16 is a block diagram showing portions of the photometering circuit corresponding to the photometering area A. A photoelectric conversion circuit 30 outputs a signal conforming to the intensity of light from an object field corresponding to one of the plurality of photometering areas A–I, and a charge conforming to the output of the photoelectric conversion circuit 30 is accumulated in a capacitor 34. A first comparing circuit 32 compares the voltage of the capacitor 34 with a reference voltage E1, and outputs a positive voltage S1 when the voltage of the capacitor 34 exceeds the reference voltage E1. A second comparing circuit 33 compares the voltage of the capacitor 34 with a reference voltage E2, and operates similarly to the first comparing circuit 32, but the reference voltage E2 is set to a greater level than the reference voltage E1.

Figure 17:
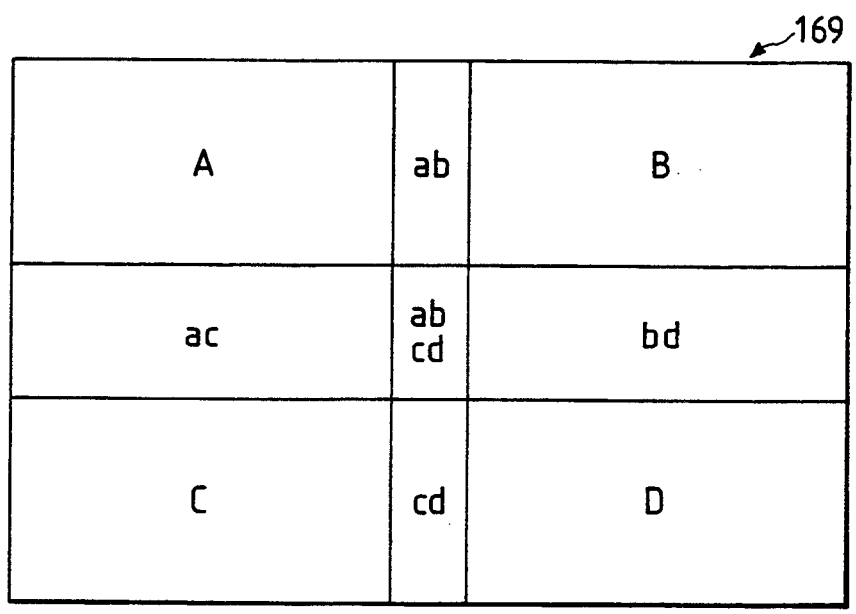
FIG. 17 shows a modification of the light distribution control element in the second embodiment.

FIG. 17 shows a modification of the light distribution control element in the second embodiment. In the embodiment of FIG. 9, in conformity with the operation of the main control portions proximate to each other, the sub-control portion therebetween operates, while in the modification of FIG. 17, a sub-control portion abcd at the center of a light distribution control element 169 is not adjacent to main control portions A, B, C and D, but yet operates in conformity with the operation of the main control portions.

In order to reduce the difference between the exposure amounts controlled by the four main control portions A, B, C and D, the sub-control portion abcd must be controlled by a circuit discrete from the circuit shown in FIG. 11 which controls the sub-control portions ab, ac, cd and bd. A method therefor is suitably to make the exposure amount controlled by the sub-control portion abcd be between the maximum value and the minimum value of the exposure amount controlled by the four main control portions A, B, C and D.

Figure 18:
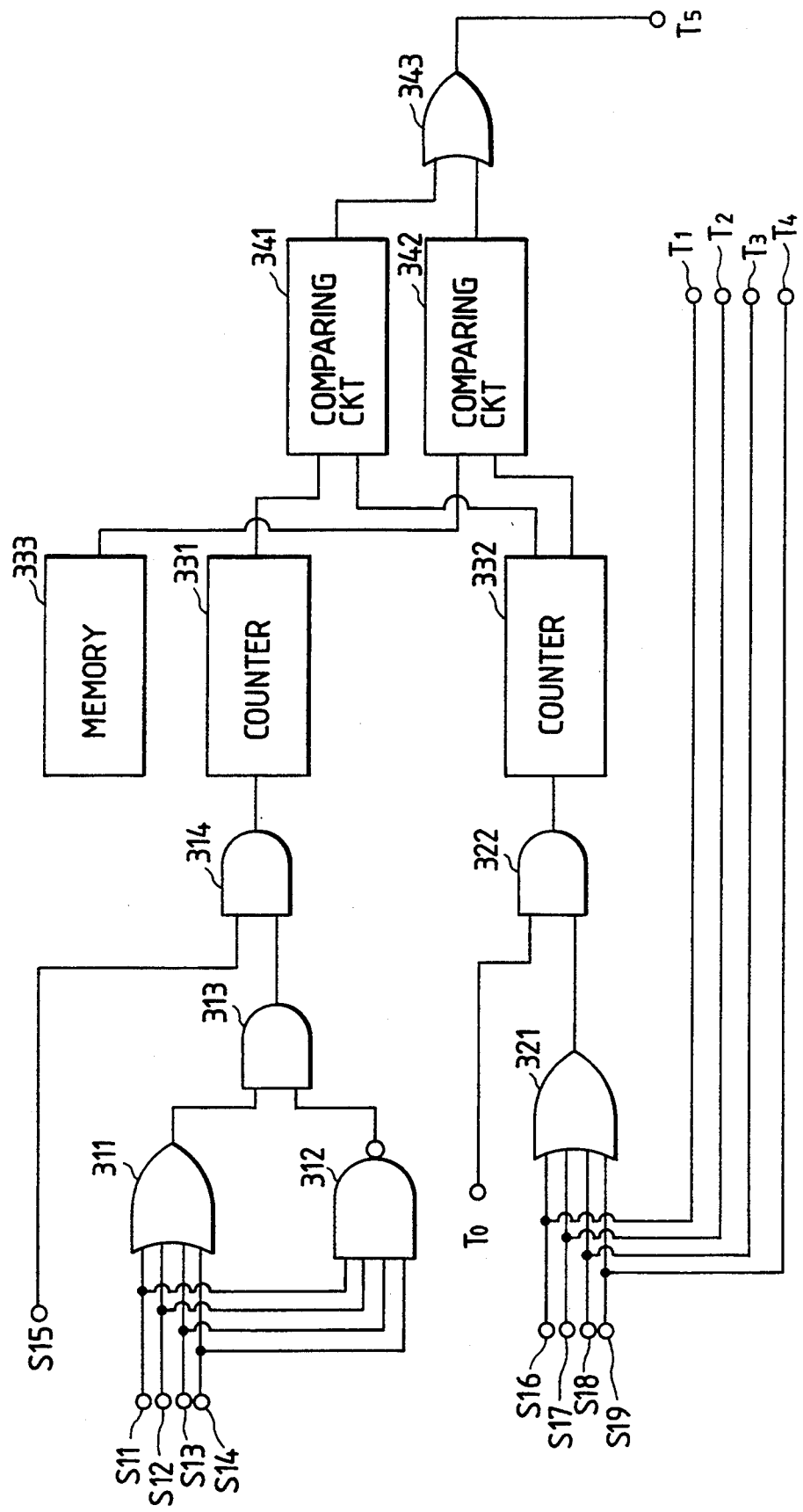
FIG. 18 is a diagram showing a passage control circuit for controlling a sub-control portion abcd.

A circuit for this is shown in FIG. 18. First photometry is first effected, and when the photometering area A reaches a first exposure amount, a positive voltage S11 is output, and when the photometering area B reaches the first exposure amount, a positive voltage S12 is output, and when the photometering area C reaches a third exposure amount, a positive voltage S13 is output, and when the photometering area D reaches a fourth exposure amount, a positive voltage S14 is output. The output of an AND circuit 313 becomes such that by an OR circuit 311 and a NAND circuit 312, a positive voltage is created for the time from the inputting of the first one of S11, S12, S13 and S14 till the inputting of the last one. Since an AND circuit 314 receives a clock pulse S15 as an input, a counter circuit 331 counts and memorizes as a pulse number the difference between the time when the four photometering areas A, B, C and D reach the minimum first exposure amount and the time when they reach the last first exposure amount.

Subsequently, second photometry is effected, and when the photometering area A reaches a second exposure amount greater than the first exposure amount, a positive voltage S16 is output, and S16 is input to a terminal T1 connected to the main control portion A and an OR circuit 321, and when the photometering area B reaches the second exposure amount, a positive voltage S17 is output, and S17 is input to a terminal T2 connected to the main control portion B and the OR circuit 321, and when the photometering area C reaches the second exposure amount, a positive voltage S18 is output, and S18 is input to a terminal T3 connected to the main control portion C and the OR circuit 321, and when the photometering area D reaches the second exposure amount, a positive voltage S19 is output, and S19 is input to a terminal T4 connected to the main control portion D and the OR circuit 321. By the inputting of the positive voltage to T1, passage control for reducing the transmittance of the main control portion A to approximately zero is effected, and by the inputting of the positive voltage to T2, passage control for reducing the transmittance of the main control portion B to approximately zero is effected, and by the inputting of the positive voltage to T3, passage control for reducing the transmittance of the main control portion C to approximately zero is effected, and by the inputting of the positive voltage to T4, passage control for reducing the transmittance of the main control portion D to approximately zero is effected. Also, an AND circuit 322 receives as inputs the output of the OR circuit 321 and the clock pulse of T0, and inputs a pulse number to a counter circuit 332. When the pulse number being counted by this counter 332 reaches the number memorized in the counter 331, a voltage is produced from a comparing circuit 341 and provides a passage control signal for reducing the transmittance of the sub-control portion regulating area abcd to approximately zero.

Also, there is a case where the object is at a very distant location and one of the photometering areas A–D does not reach the first exposure amount and therefore, a predetermined value is memorized in a memory 333, and when the counter 332 reaches the value of the memory 333, a positive voltage is produced from a comparing circuit 342.

As described above, when the outputs from the comparing circuit 341 and the comparing circuit 342 are input to an OR circuit 343 and the value of the counter 332 reaches the value of the counter 331 or the memory 333, a positive voltage from T5 is output to the sub-control portion abcd, whereby the transmittance of the sub-control portion abcd is reduced to approximately zero. The control portion calculating means for controlling the sub-control portion abcd differs from that of FIG. 4 in the input number of positive voltages when the first exposure and the second exposure are reached, and is the same as that of FIG. 4 in the other points.

Assuming that in FIG. 17, the quantity of passed flash in the main control portion A is maximum and the quantity of passed flash in the adjacent main control portion B is minimum, the quantity of passed flash in the sub-control portion abcd becomes equal to the quantity of passed flash in the sub-control portion ab, and the irregularity of irradiating light by the difference between the quantities of passed flash in the main control portions A and B can be alleviated by the sub-control portions ab and abcd. Also, the quantities of passed flash in the main control portions C and D are at least between those in the main control portions A and B. Accordingly, the quantity of passed flash in the sub-control portion abcd, as compared with that in the main control portion A or B, becomes a value approximate to the quantity of passed flash in the main control portion C or D and therefore, the irregularity of irradiation created by the main control portions C, D and the sub-control portion abcd is also reduced.

On the other hand, when it is assumed that the quantity of passed flash in the main control portion A is maximum and the quantity of passed flash in the diagonal main control portion D is minimum, the quantities of passed flash in the main control portions B and C are at least between those in the main control portions A and D and therefore, the quantity of passed flash in the sub-control portion abcd becomes smaller than the quantity of passed flash in the sub-control portion ab or the sub-control portion ac, and becomes greater than the quantity of passed flash in the sub-control portion bd or the sub-control portion cd. Accordingly, the quantity of passed flash in the sub-control portion abcd becomes an appropriate quantity and the irregularity of irradiation can be more reduced.

According to the present invention, it has become possible to provide an electronic flash apparatus in which the number of photometering areas is not increased but only the number of divisions of the light distribution control element is increased, whereby the irregularity of flash can be alleviated by a minimum increased and a minimum increased weight.

In the present embodiment, to make the description easy to understand, the silicon photodiode for photometering the reflected light from each area of the object field has been shown and described as being provided in the flash lighting apparatus, but alternatively, it may be provided on the camera side.

What is claimed is:

1. A flash lighting apparatus including:
   a flash light emitting portion;
   a booster circuit for boosting an input voltage and outputting a boosted voltage;
   a first accumulation circuit for accumulating therein electrical energy in accordance with said boosted voltage;
   a light emission control circuit for causing said light emitting portion to emit flash light based on the electrical energy accumulated in said first accumulation circuit;
   a second accumulation circuit for accumulating therein electrical energy in accordance with said boosted voltage;
   a light quantity adjusting device disposed on an optical path of flash light emitted by said light emitting portion for adjusting a quantity of flash light projected to an object field; and
   a control circuit for controlling said light quantity adjusting device based on the electrical energy accumulated in said second accumulation circuit.

2. A flash lighting apparatus including:
   a flash light emitting portion;
   a light control device having a plurality of main control portions and at least one sub-control portion for effecting control of quantities of flash light emitted by said light emitting portion and projected to respective portions of an object field, said light control device being disposed on an optical path of flash light emitted by said light emitting portion, said sub-control portion being adjacent to at least two of said main control portions; and
   an adjusting circuit for adjusting said sub-control portion so that the quantity of light emitted by said light emitting portion and projected by said sub-control portion may be between the quantities of light emitted by said light emitting portion and projected by said adjacent main control portions.

3. A flash lighting apparatus according to claim 2, further including a photometering circuit for photometering the same number of areas as said plurality of main control portions, and performing a first photometering operation and a second photometering operation during a flash light emitting operation of said light emitting portion, and wherein said adjusting circuit adjusts said sub-control portion based on the result of said first photometering operation, and adjusts said plurality of main control portions based on the result of said second photometering operation.

4. A flash lighting apparatus according to claim 2, wherein said sub-control portion is disposed between said adjacent main control portions and has an area substantially less than the area of each of said adjacent main control portions.

5. A flash lighting apparatus including:

a flash light emitting portion;

a photometering circuit for photometering a plurality of areas in an object field;

a plurality of light control portions disposed on an optical path between the object field and said light emitting portion for controlling quantities of flash light emitted by said light emitting portion and projected to respective portions of said object field; and a control circuit for controlling said plurality of light control portions, the number of said plurality of light control portions being greater than the number of the plurality of areas photometered by said photometering circuit.

6. A camera system including:

a flash light emitting portion;

a light control device having a plurality of main control portions and at least one sub-control portion for effecting control of quantities of flash light emitted by said light emitting portion and projected to respective portions of an object field, said light control device being disposed on an optical path of flash light emitted by said light emitting portion, said sub-control portion being adjacent to at least two of said main control portions; and an adjusting circuit for adjusting said sub-control portion so that the quantity of light emitted by said light emitting portion and projected by said sub-control portion may be between the quantities of light emitted by said light emitting portion and projected by said adjacent main control portions.

7. A camera system, according to claim 6, further including a photometering circuit for photometering the same number of areas as said plurality of main control portions, and performing a first photometering operation and a second photometering operation during a flash light emitting operation of said light emitting portion, and wherein said adjusting circuit adjusts said sub-control portion based on the result of said first photometering operation, and adjusts said plurality of main control portions based on the result of said second photometering operation.

8. A camera system according to claim 5, wherein said sub-control portion is disposed between said adjacent main control portions and has an area substantially less than the area of each of said adjacent main control portions.

* * * * *